United States Patent [19]

Kimura

[11] Patent Number: 4,698,796
[45] Date of Patent: Oct. 6, 1987

[54] DISK RECORDING AND/OR REPRODUCING APPARATUS WITH COMPENSATION FOR EXTRANEOUS FORCE DURING TRACK JUMP

[75] Inventor: Shuichi Kimura, Saitama, Japan

[73] Assignee: Sony Corporation, Tokyo, Japan

[21] Appl. No.: 642,950

[22] Filed: Aug. 21, 1984

[30] Foreign Application Priority Data

Aug. 22, 1983 [JP] Japan .................................. 58-152921

[51] Int. Cl.[4] ........................ G11B 21/08; G11B 7/095
[52] U.S. Cl. ........................................ 369/44; 369/32; 369/33; 358/342
[58] Field of Search ........................ 369/32, 33, 41, 44, 369/46; 358/907, 342; 360/78

[56] References Cited

U.S. PATENT DOCUMENTS

| 4,330,880 | 5/1982 | Van Dijk. | |
|---|---|---|---|
| 4,494,154 | 1/1985 | Akiyama | 358/342 |
| 4,539,664 | 9/1985 | Deguchi et al. | 358/907 |

FOREIGN PATENT DOCUMENTS

| 0125019 | 11/1984 | European Pat. Off. | 369/32 |
|---|---|---|---|
| 0136051 | 4/1985 | European Pat. Off. | |

2125187  2/1984  United Kingdom.

OTHER PUBLICATIONS

Patent Abstracts of Japan, vol. 6, No. 145, Aug. 4, 1982, p. 132.
Patent Abstracts of Japan, vol. 7, No. 26, Feb. 2, 1983, p. 172.
Patent Abstracts of Japan, vol. 7, No. 156, Jul. 8, 1983, p. 209.
Patent Abstracts of Japan, vol. 8, No. 48, Mar. 3, 1984, p. 258.

Primary Examiner—Raymond F. Cardillo
Assistant Examiner—James E. Tomassini
Attorney, Agent, or Firm—Lewis H. Eslinger; Alvin Sinderbrand

[57] ABSTRACT

A low-frequency component of a tracking error signal is supplied to a linear motor employed as a feed motor for controlling relative movement of a disk and pickup in the radial direction of the disk. This prevents a spurious sliding movement of the pickup during a track jump, even if the disk and the player apparatus with which it cooperates are inclined with respect to a horizontal plane.

5 Claims, 3 Drawing Figures

DISK RECORDING AND/OR REPRODUCING APPARATUS WITH COMPENSATION FOR EXTRANEOUS FORCE DURING TRACK JUMP

BACKGROUND OF THE INVENTION

1. Field of the Invention

The present invention relates to a disk recording and/or reproducing apparatus for feeding one of a rotating disk and a pickup relative to the other by a linear motor in the radial direction of the disk, that is, in the tracking direction.

2. Description of the Prior Art

In a compact disk player as an optical disk reproducing apparatus, a tracking control system consists of a fine tracking control system and a coarse tracking control system.

The fine tracking control system controls a tracking mirror or an objective lens so that a beam spot correctly traces the tracks on a compact disk during reproduction in accordance with a tracking error signal. For the system controlling the tracking mirror, a technique disclosed in U.S. Pat. No. 3,944,727 is known. For the system controlling the objective lens, a technique as disclosed in U.K. Pat. No. 1,421,586 or European Patent application publication No. 68757 of the present applicant is known.

The coarse tracking control system feeds an optical pickup by supplying a low-frequency component of a tracking error signal to a feed motor so as to allow the pickup to follow along a feed shaft of a feeding mechanism to compensate for eccentricity of a compact disk itself, eccentricity occurring from chucking, or eccentricity of a disk table.

In this coarse tracking control system, in order to improve response characteristics of servo control, nonlinearity of the feeding operation must be eliminated. For this purpose, the feed shaft of the feeding mechanism is inclined in the radial direction of the compact disk so as to eliminate nonlinearity attributed to friction.

When a track jump is performed in an access mode or the like, that is, when a tracking jump pulse signal is applied to a tracking coil for controlling the tracking mirror or the objective lens and the beam spot is crossing a track, the servo loops of the fine and coarse tracking control systems are open.

Since a linear motor does not have a transmission mechanism for transmitting driving force, the transmission mechanism does not support a movable member. Therefore, if a linear motor is used as a feed motor of the coarse tracking control system, an optical pickup A tends to slide in the inclined direction of the feed shaft during a track jump by a force $W \times \sin \theta$ where $W$ is the weight of the optical pickup A and $\theta$ is the inclined angle thereof, as shown in FIG. 1. If the inclined angle $\theta$ is sufficiently large, the pickup A actually slides down.

As a result, the track jump in the access mode or the like becomes extremely unstable. Thus, a track jump falling outside the range of a preset number of track jumps is performed, settlement of the optical pickup after the track jump is poor and the access time becomes long.

A method has been proposed by the present applicant in accordance with which a feed signal for feeding in a track jump direction is supplied to the feed motor during a track jump so as to perform the track jump over a distance exceeding a movable distance of the tracking mirror or the objective lens. In this case, if a linear motor is used as the feed motor, and a force generated by the linear motor in response to the feed signal is represented by f, a force $f \pm W \times \sin \theta$ is applied on the optical pickup A.

For this reason, in this method, the optical pickup may not be able to jump a predetermined number of tracks or may jump over a predetermined number of tracks.

SUMMARY OF THE INVENTION

It is an object of the present invention to provide a disk recording and/or reproducing apparatus which is capable of performing a stable track jump even if a linear motor is used as a feed motor, a feeding mechanism is inclined in a feeding direction, or an acceleration force acts in the feeding direction.

It is another object of the present invention to provide a disk recording and/or reproducing apparatus which is capable of performing a stable track jump even if a linear motor is used as a feed motor for a coarse tracking control system, a feeding mechanism is inclined in a feeding direction, or an acceleration force acts in the feeding direction.

In order to achieve the above and other objects of the present invention, there is provided a disk recording and/or reproducing apparatus for feeding one of a rotating disk and a pickup relative to the other thereof by a linear motor in a radial direction of the disk, the apparatus comprising a first circuit for extracting a low-frequency component of a tracking error signal, a second circuit for holding the low-frequency component, and switching means for supplying a value held in the second circuit to the linear motor during a track jump.

In the disk recording and/or reproducing apparatus of the present invention, even if the feeding mechanism is inclined in the feeding direction or an acceleration force acts in the feeding direction, an undesirable force acting in the feeding direction is cancelled so that a stable jump can be performed.

DETAILED DESCRIPTION OF THE PREFERRED EMBODIMENT

An embodiment of the present invention applied to a compact disk player will be described with reference to FIGS. 2 and 3.

Figure 1:
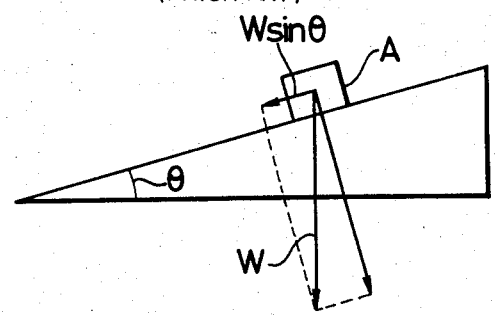
FIG. 1 is a vector diagram for explaining a prior art technique.
Figure 2:
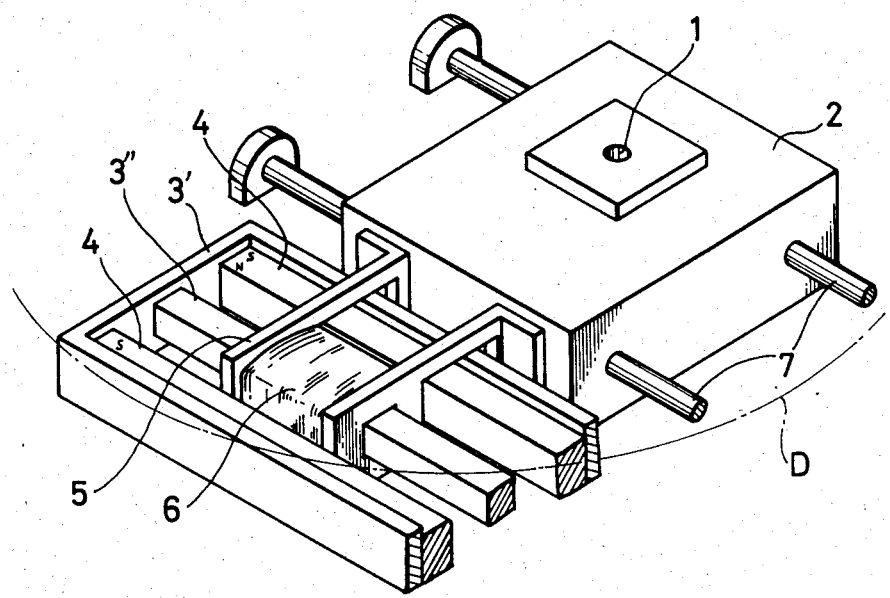
FIG. 2 is a schematic perspective view showing a mechanism according to an embodiment of the present invention.

FIG. 2 shows an optical pickup which is driven and controlled by a linear motor. The linear motor used herein comprises a magnetic circuit consisting of yokes 3' and 3" and a magnet 4, and a coil 6 wound around a coil bobbin 5 through which the yoke 3" is inserted. An optical pickup 2 having an objective lens 1 thereon is fed on a feed shaft 7 by the linear motor in the radial direction of a compact disk D.

The construction of the objective lens 1 is not shown. However, the objective lens 1 constitutes part of a fine tracking control system which is driven by a tracking error signal. Spiral or concentric tracks are formed on a recording surface of the compact disk D.

Figure 3:
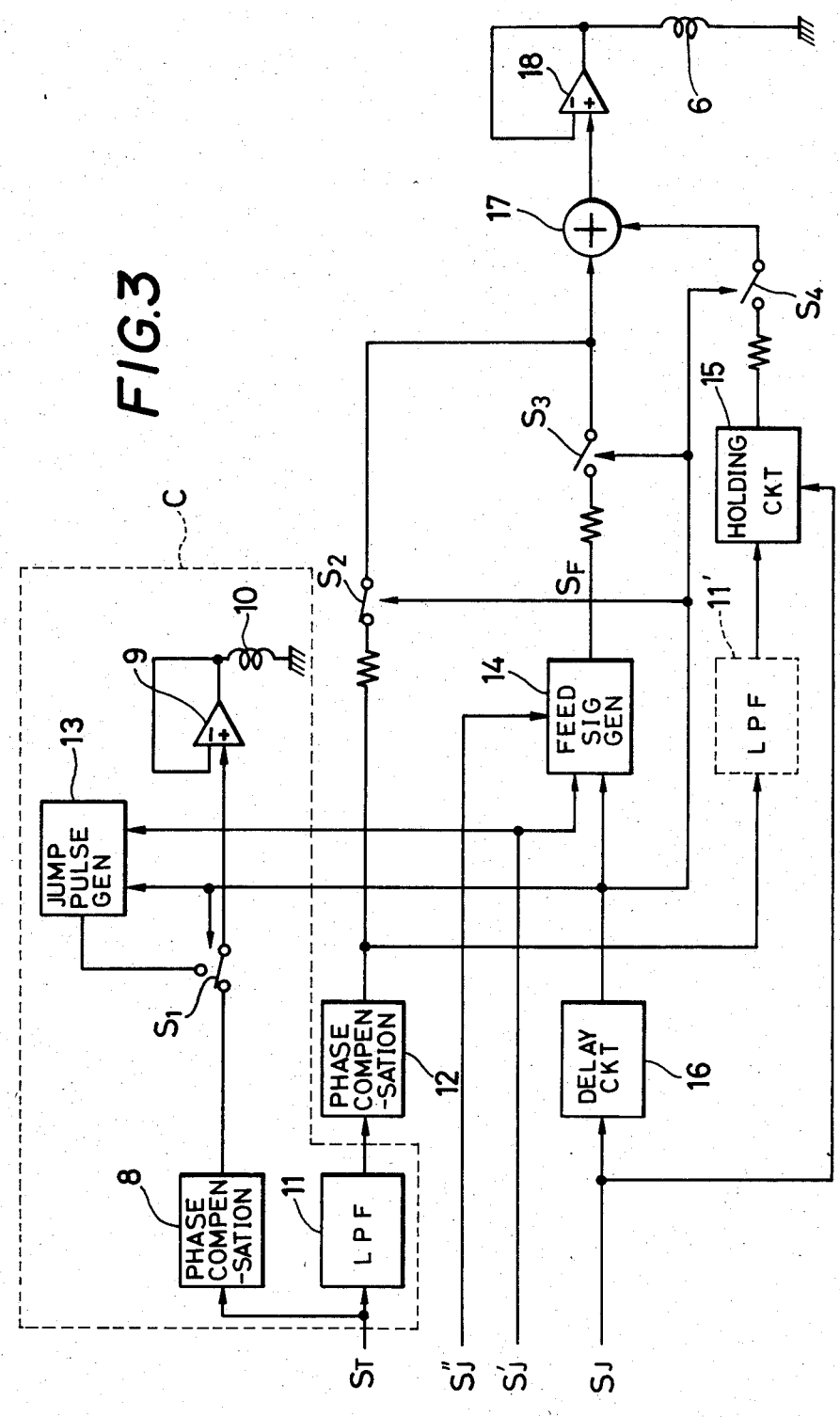
FIG. 3 is a block diagram showing a circuit of the embodiment of the present invention.

FIG. 3 shows a block diagram of the tracking control system. First through fourth switches $S_1$ to $S_4$ shown in FIG. 3 are set in the normal reproduction mode.

In the reproduction mode, fine tracking control is performed when a tracking error signal $S_T$ is supplied to a tracking coil 10 through a phase compensation circuit 8, the first switch $S_1$, and a driver 9.

Coarse tracking control is performed by filtering the tracking error signal $S_T$ by a low-pass filter 11 and supplying a low-frequency (below about 8 Hz) component to the coil 6 of the linear motor through a phase compensation circuit 12, the second switch $S_2$, an adder 17, and a driver 18.

Upon this coarse tracking control, a beam spot correctly traces the track compensating for eccentricity of the compact disk D itself, eccentricity occurring from chucking, or eccentricity of a disk table.

In the access mode, address data recorded on a track being read by a beam spot is compared with target address data. In accordance with a comparison result, a signal $S_J'$ representing whether the optical pickup 2 is to be driven in the inward or outward radial direction of the compact disk D is supplied to a jump pulse generator 13 and a feed signal generator 14.

A track jump command signal $S_J$ is also supplied to a holding circuit 15. The low-frequency component (below about 8 Hz) of the tracking error signal $S_T$ is held by the holding circuit 15 at the leading edge of the track jump command signal $S_J$.

The track jump command signal $S_J$ is also supplied to a delay circuit 16. A delayed track jump command signal $S_J$ from the delay circuit 16 is supplied to the first through fourth switches $S_1$ to $S_4$. Then, the first and second switches $S_1$ and $S_2$ are opened, while the third and fourth switches $S_3$ and $S_4$ are closed. When the first switch $S_1$ is thus opened, the servo loop for fine tracking control is opened. When the second switch $S_2$ is opened, the servo loop for coarse tracking control is opened.

The delayed track jump command signal $S_J$ is also supplied to the feed signal generator 14. A feed signal $S_F$ from the feed signal generator 14 and the held value of the low-frequency component of the tracking error signal $S_T$ held by the holding circuit 15 are added by the adder 17. A summed signal from the adder 17 is supplied to the coil 6 of the linear motor through the driver 18 so as to perform a track jump.

The value of the low-frequency component of the tracking error signal $S_T$ substantially corresponds to the force $W \times \sin \theta$ which is a sliding force due to the weight of the optical pickup 2 and the inclination of the feeding mechanism in the radial direction of the compact disk D.

Therefore, when the feed signal $S_F$ is added to this low-frequency component or the held value thereof, the force acting to slide the optical pickup 2 downward is cancelled. As a result, a track jump is performed as if the feeding mechanism was arranged horizontally. Accordingly, a stable track jump can be performed.

In the access mode, address data $A_{P1}$ recorded on a track being traced by a beam spot is compared with address data $A_D$ set as a target access address. A track jump for one, ten or a hundred tracks, for example, is performed in accordance with the comparison result.

After the track jump, the servo loops for fine and coarse tracking control are closed. Address data $A_{P2}$ recorded on a track to which the spot has jumped is read thereby.

The address data $A_{P2}$ is compared with the address data $A_D$. If they do not coincide with each other, another track jump is performed. In this manner, track jumps are repeated, and an access is completed when the address data $A_{PN}$ and the address data $A_D$ coincide with each other.

The operation for performing a track jump in this manner will be described in more detail below. Upon every track jump, a new low-frequency component is held by the holding circuit 15. However, since the difference between the address data $A_{PN}$ and the address data $A_D$ is great initially, a track jump of a large number of tracks, e.g., of 100 tracks, is performed. In this case, the held value of the low-frequency component is added to the feed signal $S_F$ by the adder 17. The summed signal is supplied to the coil 6 through the driver 18 so as to drive the linear motor accordingly to feed the pickup 2. Then, a jump pulse from the jump pulse generator 13 is supplied to the tracking coil 10 through the driver 9 and the objective lens 1 is also moved forward.

When the difference between the address data $A_{PN}$ and the address data $A_D$ is small, a track jump of ten tracks or one track is performed. In the case of a small track jump, generation of the feed signal $S_F$ is prohibited by a signal $S_J''$ which represents that the track jump is small.

As a result of this, since only the held value of the low-frequency component is supplied to the coil 6 through the driver 18, the optical pickup 2 is held by the linear motor such that the pickup 2 will not slide down. When a track jump pulse for a small track jump is supplied to the tracking coil 10 from the jump pulse generator 13 through the driver 9, only the objective lens 1 is moved forward. In this manner, a reliable track jump can be performed all the time and quick access can also be performed.

It is to be understood that a track jump can be performed keeping the objective lens fixed in position along the tracking direction while driving the linear motor alone to feed the pickup. In this case, the circuit surrounded by a dotted line C in FIG. 3 is omitted, and the feed signal generator 14 also generates a track jump pulse. Furthermore, the low-pass filter 11 is connected at a position indicated by reference numeral 11'.

In this embodiment, the rotating center of the optical disk D is fixed, and the optical pickup 2 is fed by the linear motor. However, the pickup 2 may be fixed in position, and the optical disk D fed by the linear motor.

In this embodiment, the present invention is applied to a compact disk player in which the feed shaft 7 is inclined. However, the present invention can be effectively applied to an apparatus wherein the feed shaft 7 is horizontal but an acceleration force or centrifugal force acts, such as an apparatus for a vehicle.

Furthermore, in the above embodiment, the present invention is applied to a compact disk player which is an optical disk player. However, if the present invention is applied to an optical disk recording apparatus, a feed operation is performed in accordance with a tracking error signal caused by a pre-groove formed in a recording surface of the disk.

In summary, according to the present invention, a disk recording and/or reproducing apparatus in which one of a rotating disk and a pickup is driven relative to the other thereof by a linear motor in the radial direction of the disk, i.e., the tracking direction, is characterized in that a low-frequency component of a tracking error signal corresponding to an undesirable force acting along the feed shaft due to inclination of the feed shaft or the like is held, and the held value is applied to the linear motor so as to cancel the undesirable force acting along the feed shaft.

Therefore, even if an undesirable force acts along the feed shaft during a track jump (i.e., the feed servo loop of the linear motor is open), a track jump of a predetermined number of tracks can be performed, thereby allowing a stable track jump.

What is claimed is:

1. A disk recording and/or reproducing apparatus for moving one of a rotating disk and a pickup relative to the other in a radial direction of the disc, said apparatus being inclined at an angle with respect to the horizontal so that a bias force tends to cause relative movement of the disk and pickup relative to each other in the radial direction of the disk; said apparatus comprising a linear motor, a first circuit for extracting a low-frequency component of a tracking error signal, a second circuit for holding the low-frequency component, and switching means for supplying a value held in said second circuit to said linear motor during a track jump, said value substantially counteracting said bias force during said track jump.

2. An optical disk recording and/or reproducing apparatus for moving one of a rotating optical disk and an optical pickup relative to the other thereof in a radial direction of the optical disk, said apparatus being inclined at an angle with respect to the horizontal so that a bias force tends to cause relative movement of the disk and pickup relative to each other in the radial direction of the disk; said apparatus comprising a linear motor, a first circuit for extracting a low-frequency component of a tracking error signal, a second circuit for holding the low-frequency component, and switching means for supplying a value held in said second circuit to said linear motor during a track jump, said value substantially counteracting said bias force during said track jump.

3. An optical disc recording and/or reproducing apparatus having a linear motor and a rotating optical disk and an optical pickup moved relatively to each other by said linear motor in a radial direction of said optical disk, said apparatus being inclined at an angle with respect to the horizontal so that a bias force tends to cause relative movement of the disk and pickup relative to each other in the radial direction of the disk; said apparatus comprising a first circuit for extracting a low-frequency component of a tracking error signal, a second circuit for holding the low-frequency component, switching means for supplying the held value in said second circuit to said linear motor during a track jump, a third circuit for generating a feed signal, and means for adding the feed signal to the held value to produce a summed signal for supply to said linear motor during the track jump, said value substantially counteracting said bias force during said track jump.

4. An optical disk recording and/or reproducing apparatus having a linear motor and a rotating optical disk and an optical pickup moved relatively to each other by said linear motor in a radial direction of said optical disk, said apparatus being inclined at an angle with respect to the horizontal so that a bias force tends to causes relative movement of the disk and pickup relative to each other in a radial direction of the disk; said apparatus comprising a first circuit for extracting a low-frequency component of a tracking error signal, a second circuit for holding the low-frequency component, switching means for supplying the held value in said second circuit to said linear motor during a track jump, a third circuit for generating a jump pulse, and means for adding the jump pulse to the held value to produce a summed signal for supply to said linear motor, said value substantially counteracting said bias force during said track jump.

5. An apparatus according to any one of claims 1 to 4, characterized in that said apparatus is for a vehicle.

* * * * *